Patented Apr. 8, 1952

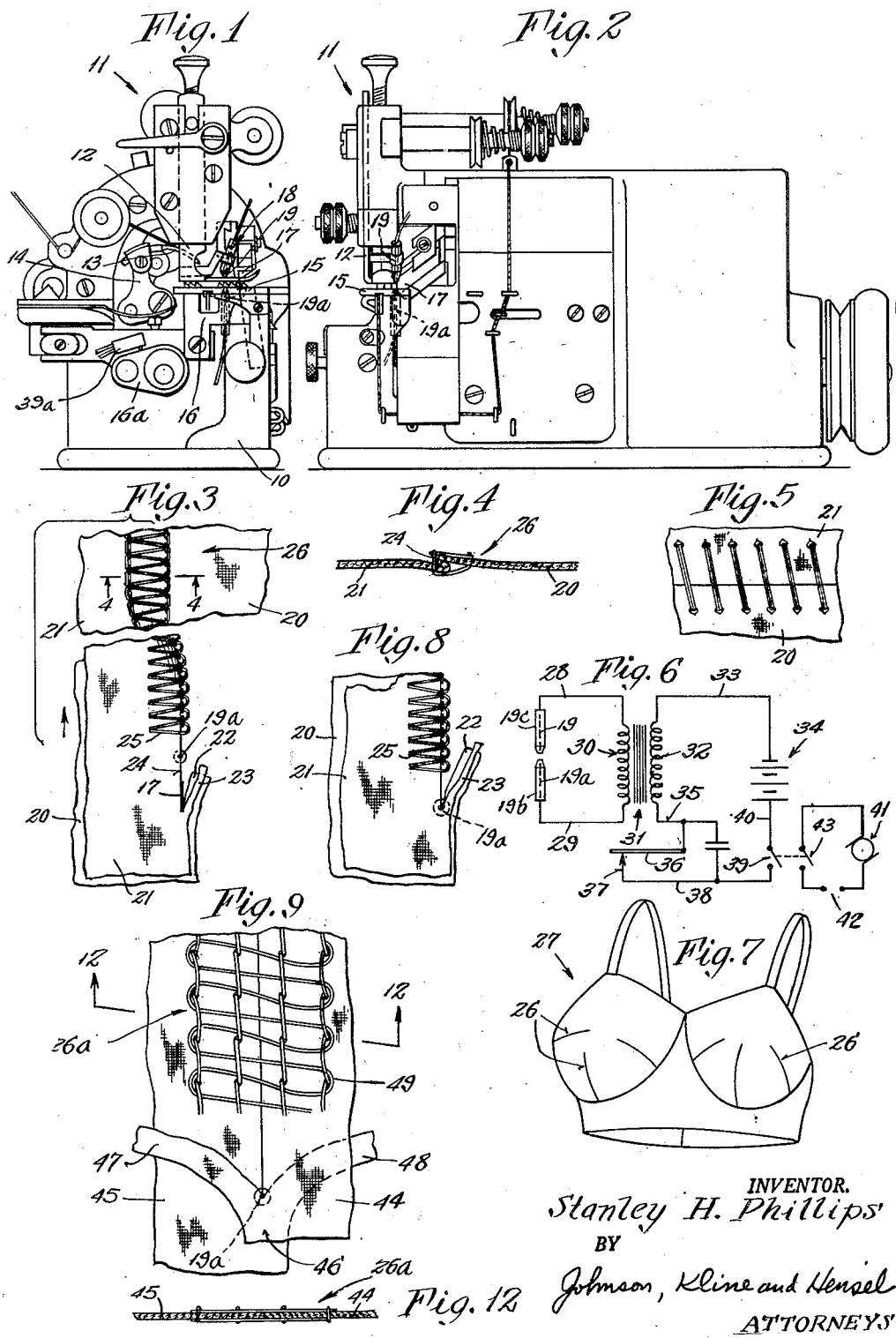

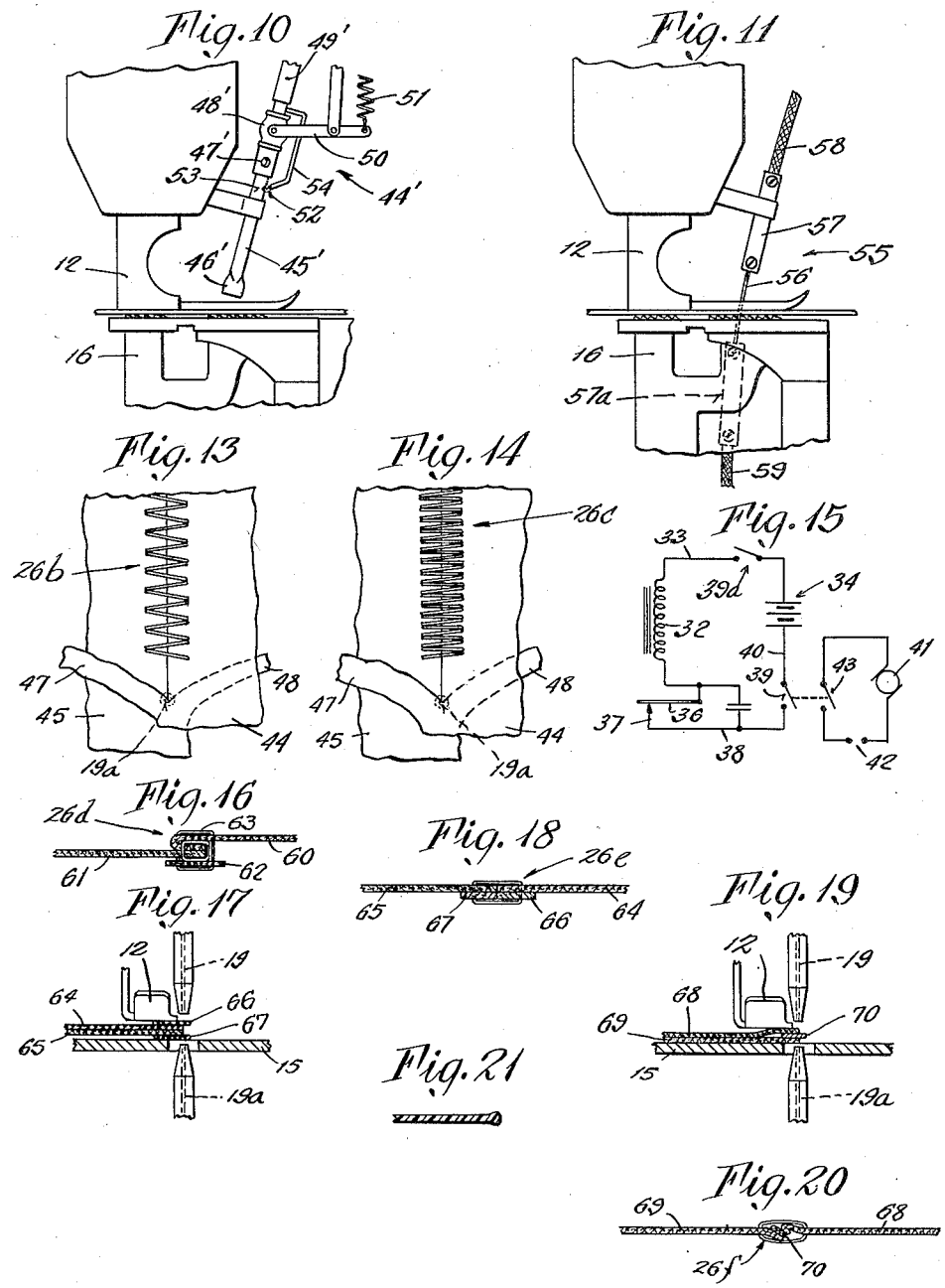

2,592,463

UNITED STATES PATENT OFFICE 2,592,463

MACHINE FOR CUTTING, PROCESSING, AND/OR SEAMING FABRIC OR LIKE SECTIONS AND PRODUCT THEREOF

Stanley H. Phillips, Stratford, Conn., assignor to The Warner Brothers Company, Bridgeport, Conn., a corporation of Connecticut Application October 10, 1946, Serial No. 702,460

10 Claims. (Cl. 112—2)

This invention relates to the cutting, processing, and/or seaming or joining together of fabric sections, thin sheets of cloth-like flexibility and the like, and to products formed thereby.

The invention is applicable to thin flexible thermoplastic sheets and to fabrics having thermoplastic fibres which will fuse or melt upon being subjected to heat. The fabrics may be composed entirely of such fibres, or may be composed of such fibres in conjunction with fibres of vegetable or animal origin, such as cotton, wool etc.

An object of the invention is to provide an improved machine and method for cutting and/or processing thermoplastic sheets and fabric sections having thermoplastic fibres, thereby to quickly produce accurate cut-out forms having trimmed edges which, in the case of fabric sections, are strong and resistant to raveling, the said forms being produced with less tooling and tool upkeep than was heretofore possible, and in a more convenient and economical manner.

Another object of the invention, related to the above object, is to provide an improved machine and method for processing and seaming or joining together the edge portions of flexible thermoplastic sheets and fabric sections having thermoplastic fibres, so as to form a strong and flat seam having very little bulk or size.

The seam is so formed that overlapping of the edge portions of the sheets or fabric sections is practically eliminated, resulting in a substantial saving of material at the seams, which in the case of garments having a relatively great amount of seaming may result in overall saving of material as great as 5% or more, and this is an important feature of the invention.

A further object of the invention is to provide an improved seamed garment or article of attire, particularly a form-fitting fabric garment constituted of seamed fabric sections, in which the seams are strong and especially unobtrusive and unnoticeable.

In accomplishing these objects, according to the invention, flexible thermoplastic sheets, or fabric sections containing thermoplastic fibres are fed into a machine which may have a feeding mechanism similar to that of a sewing machine, the sheets or sections when in the machine traversing and being subjected to a thermal device which produces a burning or cutting heat, and which cuts or severs the work and/or processes the latter by fusing the cut edges thereof, which in the case of fabric sections, involves fusing together the thermoplastic fibres of the sections. If a plurality of workpieces are to be simultaneously cut and/or processed or treated, this may be readily accomplished by superposing one workpiece on another and traveling the superposed pieces as a whole through the machine. The speed of travel of the workpieces may be as rapid as a fast sewing operation, or even more rapid, and by cutting a plurality of pieces at one time the rate of production becomes quite high.

The thermal device of the invention which accomplishes the cutting or severing, and fusing does so entirely or practically entirely by the action of heat, without resorting to auxiliary mechanical means such as blades, dies and the like, the device producing a relatively high temperature, concentrated and localized heat which quickly burns through and accurately severs the fabric sections and simultaneously fuses the fibres thereof. Due to the absence of mechanical cutting tools, tool or die expense for the machine is absent. The cutting or severing is so carried out that the sections may have various shapes as determined by their path of travel, and these shapes may be easily altered by merely guiding the workpieces differently. After the severing of fabric sections according to the invention, the trimmed edges will not fray or ravel due to the fibres at the edges being fused together.

In cases where it is desired to join together the edge portions of two workpieces, for instance, this may be readily done during or immediately after the processing of the edge portions thereof, according to the invention, either solely by fusion of one workpiece with the other as the thermal device is cutting the pieces, or by keeping the processed or treated edge portions of the pieces disunited during the cutting and processing, and then sewing these together after, and preferably immediately after, they have been subjected to the thermal device, or by both fusing together and sewing together the edge portions.

In the latter instance an advantageous method is to superpose one workpiece on the other with the edge portions juxtaposed, and sew the edge portions together with an overseam stitch, the said stitch being so regulated that upon the workpieces being spread apart to flatten the seam, the width of the latter will be of relatively small magnitude, as for example $\frac{1}{16}''$, and this may be done without reducing below a practical value the strength of the seam. Where the workpieces are fabric sections, the uniting of the fibres of one section to another by fusion, together with the flexibility and deformability of the fibres and thermoplastic material, is such that upon the sewed seam being flattened out the edge portions of the fabric sections will be brought practically into abutting relationship with virtually no overlap, which enables the seam to be very flat and to have but little bulk. The same is true where the workpieces are very thin sheets of thermoplastic material having cloth-like flexibility. In such cases, the spreading apart of the workpieces to flatten the seam will cause the fused edges to have virtually an abutting relationship, with practically no overlapping.

The thermal cutting and processing device, as illustrated in the embodiments of the invention shown herein, may comprise a length of wire electrically heated preferably to red heat or above, or may comprise a flame-producing means such as gas, or such as high-tension electrodes between which a spark and flame or arc passes. In each instance the concentrated and localized heat which is produced may be directed either against previously trimmed edge portions of the workpieces to fuse the thermoplastic material thereof, or the workpieces may be directly passed through the heat source so as to be cut or severed and/or processed thereby.

Where the workpieces are sewed together immediately after the cutting and/or processing thereof, the thermal device is combined with a sewing machine. With either of the above forms of thermal devices, the point of application of the concentrated and localized heat is preferably adjacent and immediately ahead of the point of sewing of the machine, and closely adjacent the presser foot thereof.

If a separate, mechanical cutter is to be employed to first trim the workpieces, the cutter is located immediately ahead of the thermal device so that the trimmed edges leaving the cutter are immediately subjected to the fusing spark or flame, or wire.

Where the thermal device comprises the high tension electrodes or the heated wire, the source of electrical energy therefor is controlled by a switch which is operable conjointly with the switch controlling the operation of the sewing machine. By this organization, in one embodiment of the invention, the workpieces are subjected to the burning and cutting heat during the time that the machine is in operation. In another embodiment of the invention a second switch is provided which also controls the source of electrical energy, and this second switch is operable conjointly with the feed mechanism of the machine in such a manner that the thermal device is intermittently energized during operation of the machine, the periods of energization corresponding with the intervals when the workpieces are actually in movement. These intervals, of course, alternate with the intervals when the workpieces are stationary and when the needle or needles are passing through the workpieces. Where the gas flame is employed, means are provided, operable conjointly with the sewing machine switch, for shutting off or turning on the flame automatically in keeping with the operation of the machine.

Seams as produced in accordance with the invention are relatively small in size and bulk and lie very flat, and the strength of the seams is very considerable, thereby adapting them for numerous diverse articles, including articles of attire, particularly undergarments such as brassières, corsets, panties and other form-fitting attire. Under actual test, it has been found that while the size and bulk of the seam has been considerably reduced, the strength of the seam has been increased to such an extent that failure as caused in a rupturing or tensioning test machine occurs in the material of the fabric sections at a point removed from the seam, rather than in the seam.

A brassière having the improved seam of the present invention is comfortable to wear, does not mark the flesh, and presents a smooth outward appearance and a smooth interior, being more comfortable to the wearer, these features being especially desirable in such a garment.

Other features and advantages will hereinafter appear.

In the accompanying drawings:

Figure 1 is a side elevation of a machine made in accordance with the invention for seaming or joining together fabric sections in a strong, flat tear-resistant seam of small size or bulk.

Fig. 2 is a front elevation of the machine of Fig. 1.

Fig. 3 is an enlarged view showing a pair of fabric sections in the process of being joined together in accordance with the invention, the joined portions of the sections being opened or flattened out to show one complete side of the seam.

Fig. 4 is a fragmentary section taken on the line 4—4 of Fig. 3.

Fig. 5 is a fragmentary view of the reverse side of the opened or flattened seam of Fig. 3.

Fig. 6 is a schematic circuit diagram of the machine.

Fig. 7 is a perspective view of a brassière made in accordance with the invention.

Fig. 8 is a view like Fig. 3, but showing an alternative method of seaming or joining the fabric sections.

Fig. 9 is an enlarged fragmentary plan view showing lapped edge portions of fabric sections, the said portions being trimmed and the fibres thereof fused by the machine of the invention, and the trimmed and fused edge portions being sewed together in butted relation using the well-known Flatlock seam.

Fig. 10 is a fragmentary elevational view showing another form of thermal cutting and processing device for use in the machine of the invention.

Fig. 11 is a fragmentary elevational view showing still another form of thermal cutting and processing device.

Fig. 12 is a fragmentary section taken on the line 12—12 of Fig. 9.

Fig. 13 is a view like Fig. 9, but showing a zigzag stitch instead of a Flatlock stitch.

Fig. 14 is a view like Figs. 9 and 13, but showing close stitching instead of the zigzag or Flatlock stitching.

Fig. 15 is a circuit diagram illustrating an alternative primary circuit for the high potential coil of Fig. 6.

Fig. 16 is a transverse section taken through a seam illustrating another form of the invention.

Fig. 17 is a transverse section taken through workpieces at the point of processing thereof, prior to stitching these together to form a seam representing a further modification of the invention.

Fig. 18 is a fragmentary transverse section taken through the completed seam of the workpieces shown in Fig. 17.

Fig. 19 is a transverse section taken through workpieces at the point of processing thereof and prior to stitching these together to form a seam representing still another modification of the invention.

Fig. 20 is a fragmentary transverse section taken through the completed seam of the workpieces shown in Fig. 19, and Fig. 21 is a cross-section of an edge portion of a thermoplastic sheet made and processed according to the invention.

The machine of the present invention, as shown in Figs. 1 and 2, comprises in part an overseaming sewing machine of the well-known Merrow type. However, it should be understood that the invention is not to be limited to a sewing machine such as that shown, since other types of machines having fabric feed mechanisms may also be adapted for the purposes of the invention.

The machine shown comprises a base 10 having a sewing head 11 mounting a presser foot 12, and having a needle 13 carried by an oscillating arm 14. Below the presser foot 12 the base 10 carries a work rest or plate 15, and through the latter feed dogs 16 extend for cooperation with the presser foot 12 to feed work for sewing by the needle 13.

The base 10 also mounts a trimmer blade 17 located ahead of the presser foot 12 and actuated in conjunction with the sewing mechanism of the machine, for automatically trimming workpieces which are being fed to the machine.

In accordance with the present invention a relatively high-temperature thermal device 18 adapted to cut and/or fuse fabric sections is provided adjacent the presser foot 12 and immediately ahead of the point of sewing determined by the needle 13. The device 18 is disposed to the rear of the trimmer blade 17, and is so organized that it treats or processes the trimmed edges of fabric sections leaving the trimmer blade while the sections are in movement, by rapidly fusing together the thermoplastic fibres at the trimmed edges. This fusion of the fibres takes place immediately prior to the sewing together of the edge portions.

In accomplishing this rapid fusing, the thermal device 18 produces a localized or concentrated heat having a relatively high preferably burning temperature which quickly melts or fuses the fine thermoplastic fibres of the fabric. If desired, the thermal device 18 may be used both to cut or trim the workpieces being fed to the machine and to process the trimmed edges, so that the trimmer blade 17 may be dispensed with. Where the trimmer blade 17 is retained and used, the thermal device functions essentially to treat or process the trimmed edges of the work by fusing the thermoplastic fibres thereof, and may also be used to join these edges together by such fusion of the fibres if this should be desired.

Referring to Figs. 1 and 2 illustrating one specific embodiment of the invention, the thermal device 18 is shown as comprising a pair of vertically aligned, high tension electrodes 19 and 19a which are disposed respectively one above and one below the work. The electrodes 19 and 19a are so located that when high tension electricity is applied to them a spark will jump between them, either through the work or across the trimmed edges thereof, at a point immediately ahead of the point of sewing. This is clearly illustrated in Fig. 3 which shows fabric sections 20 and 21 superposed one on the other, the said sections in their superposed relationship being fed in the direction of the arrow, and the right-hand edges 22 and 23 being trimmed by the trimmer blade 17. The trimmed edges 24 leaving the blade 17 pass between the electrodes 19 and 19a, the latter only being shown in Fig. 3. When these electrodes are charged with a high voltage, a hot spark will jump between them and this spark will melt or fuse the thermoplastic fibres along the trimmed edge portion 24. If the trimmed edge portions of the fabric sections 20 and 21 are not held closely pressed one against the other, the thermoplastic fibers of one section will fuse together solely in that section and the thermoplastic fibers of the other section will fuse together solely in the other section. If, however, the edge portions 24 of the fabric sections are maintained firmly in engagement with each other, the electrical spark will fuse the thermoplastic fibers of one section to the thermoplastic fibers of the other section. Where other fibres, such as cotton, wool and the like are present in the fabric sections, these will be burned through by the spark so that a complete severance, or trimming of the sections is effected. The percentage of such other fibres is preferably not allowed to become so high as to adversely affect the processing by which the edge portions of the fabric sections are prevented from ravelling, or prevented from being joined to each other should this be desired. Immediately after the fusion of the thermoplastic fibers of the fabric sections and as the latter are fed through the machine an overseam stitch 25 is applied to the fused edge portions 24. This overseam stitch may be the well-known Talmadge stitch as produced by the Merrow machine, or may be a zigzag stitch or any other suitable overseam stitch.

Upon the fabric sections 20 and 21 being sewed together by the overseam stitch 25 the sections may be separated or spread apart as shown in Fig. 3, so as to flatten the seam which in its flattened form is indicated by the numeral 26.

Referring to Fig. 4, it will be seen that in the flattened seam 26 the trimmed and fused edge portions 24 of the fabrics sections 20 and 21 are practically in butting relationship. These butted trimmed edge portions are shown as being fused together although they may not be fused together, the condition of fusion depending on their relative closeness during the processing by the electric spark. In any case, the thermoplastic fibers of the trimmed edge portions are fused with each other, so that the said edge portions are prevented from fraying or raveling. As a result the seam 26 has considerable strength even when the width of the seam 26 is reduced to the neighborhood of $\tfrac{1}{16}''$. It will be obvious, as shown in Fig. 4, that the seam 26 lies extremely flat, since the fabric sections do not substantially overlap each other; by making this seam to have a total width of $\tfrac{1}{16}''$ an extremely small and unobtrusive juncture is provided between the fabric sections 20 and 21 while at the same time retaining the strength of the juncture within a practical value. In some circumstances the width of the seam may be as little as $\tfrac{1}{32}''$ and yet produce a juncture with sufficient working strength to be of practical value. It will be appreciated that such seam or juncture is very unobtrusive and unnoticeable and of extremely small size or bulk. Actually where the treated or processed edge portions of the workpieces are fused one to the other, the seam does not lie perfectly flat, but instead a small fold exists in each workpiece. However, the fold is so slight, and the size or bulk of the same so small that for all practical purposes the workpieces may be considered as having an abutting relationship.

If the edge portion of one workpiece is not fused to the edge portion of the other workpiece, but instead the edge portions are merely individually processed, then when the workpieces are spread apart after being joined with the overseam stitch, the edges of the pieces may be brought into a true abutting relationship, such relationship being shown for instance in Fig. 12.

When the seam 26 is of the type known as the Talmadge seam above referred to, the under or reverse side of the seam will appear as shown in Fig. 5, and it will be seen that very little bulk is added to the seam by the presence of the stitch.

For certain uses, especially where strength of the seam is not of paramount importance but where it is essential that the seam have an extremely small size or bulk and be compact, the sewing mechanism of the machine may be disconnected or made inoperative, and the fusing of one fabric section or workpiece to the other workpiece relied upon solely to produce the seam. This method of seaming is accomplished, as mentioned above, by maintaining the edge portions of the workpieces firmly in engagement with each other at the time that the said portions are treated or processed. Such engagement enables the fusion of one edge portion to the other edge portion to take place, whether the workpieces are fabric sections or are thin thermoplastic sheets of cloth-like flexibility. Upon the workpieces being spread apart, the fused and joined edge portions will be substantially in abutting relationship to each other in the manner illustrated in Fig. 4, but without the stitches being present.

Referring to Fig. 7, an improved brassière 27 is shown formed of flexible sections with seams 26 made according to the foregoing. Such a brassière has extremely desirable characteristics, since the seams 26 are relatively strong, very flat and small in size and do not mar the contour of the garment when the latter is being worn. In fact, by use of a fancy stitch or thread the seam may be made to ornament the garment and enhance its appearance.

Considering an article of attire such as the brassière 27, it will be seen that the amount of seaming employed is quite considerable in comparison with the total amount of material used. When, in such a garment, the seams are made so that the fabric sections have an abutting relation instead of overlapping each other at their edge portions, the saving of material is quite considerable. Such saving may run in excess of 5% of the total material used in the garment, and where expensive material such as nylon fabric is employed, the saving in dollars and cents, considering a large lot of garments, amounts to a large figure. A further advantage is had in the use of the improved seam 26 as provided by the invention, in the case of garments where, for the purpose of increasing seam strength, fabrics of heavier weight or more strength are employed. Since the seam 26 in addition to being small and compact, has a very considerable strength, it may be employed in such garments to effect a saving by enabling lighter-weight fabrics, or sleazy fabrics to be used where heretofore their use was prohibited because of the resulting insufficient strength at the seams. I have found that the strength of the seams 26 is so great that for all practical purposes it is immaterial whether the seam is made along or with the warp or across the warp of the fabric, and this is a further advantage since in some instances a saving of material and reduction of scrap may be effected by cutting out the fabric sections of a garment with the warp running either lengthwise or crosswise.

The circuit diagram for the machine of Figs. 1 and 2 is illustrated in Fig. 6. As shown, the electrodes 19 and 19a are connected by wires 28 and 29 respectively to the secondary 30 of a spark coil 31, the primary 32 of which is connected by a wire 33 to one terminal of a low-tension current supply 34.

The other end of the primary coil is connected by a wire 35 to a vibrator arm 36 which cooperates with a stationary contact 37 connected by a wire 38 with a control switch 39, which latter is connected by a wire 40 with the current supply 34.

The sewing mechanism of the machine is driven from the usual motor 41 connected to a source of current 42 and controlled by a treadle or other manually operated switch 43.

In accordance with the invention, the switches 39 and 43 which respectively control the spark coil 31 and the sewing machine motor 41 are mechanically linked together so that closing of the switch 43 also closes the switch 39. By this organization the sparking electrodes 19 and 19a will be energized at all times that the machine is in operation, sewing the fabric sections 20 and 21, and when the sewing mechanism of the machine is halted, the electrodes will be deenergized so that no spark will pass between these latter.

Means are also provided by the invention for confining the spark which passes between the electrodes 19 and 19a to a predetermined fixed location, so that an accurate cutting and processing of the fabric sections 20 and 21 is accomplished. This means comprises, in the embodiment illustrated herein, a pair of glass tubes 19b and 19c respectively surrounding the electrodes 19 and 19a and having tapered ends projecting slightly beyond the ends of the electrodes. While at present it is preferred to use glass for the tubes 19b and 19c, obviously other suitable insulating material may be substituted. The arrangement of the glass tubes 19b and 19c is such that sparks and flame passing between the electrodes are closely confined against lateral movement and concentrated, producing in effect a pin-point flame or arc and thereby resulting in an accurate cutting and effective processing of the fabric sections. An organization wherein the trimmer blade 17 is dispensed with, and wherein the thermal device 18 both cuts and processes fabric sections is illustrated in Fig. 8. As shown, the fabric sections 20 and 21 are fed directly between the electrodes 19 and 19a of the thermal device and are cut or trimmed and the fibres thereof simultaneously fused by the spark passing between the electrodes. By this organization the use of cutter or trimmer blades, dies and other tools is dispensed with, and not only is the initial cost of the tooling reduced, but the tool upkeep as well.

Another form of the invention is illustrated in Figs. 9 and 12, wherein fabric sections 44 and 45 are shown, arranged so that their edge portions overlap, as at 46. The fabric sections 44 and 45 are so fed intto the machine that the overlapped portions are trimmed by the spark passing between the electrodes 19 and 19a, the spark simultaneously fusing the thermoplastic fibres of the said edge portions. The trimmed residues 47 and 48 of the fabric sections are discarded and the edges of the sections, which now lie substantially in butting relationship, are sewed together by a stitch such as the commonly used Flatlock stitch 49. By this construction an extremely strong and yet very flat seam 26a is produced which is of advantage where great strength is desired.

It will be seen from Fig. 12 that the edges of the workpieces 44 and 45 have a true abutting relationship, thereby resulting in a seam of extremely small thickness or bulk.

If desired, the workpieces 44 and 45 may be joined to each other by the simple zigzag stitch 26b shown in Fig. 13, or they may be secured together by the well-known close-stitch 26c as illustrated in Fig. 14, this latter stitch being sometimes desired for the sake of appearance.

In some instances it may be found desirable to control the energization of the thermal device 18 in such a manner that the latter is deenergized at all times that the work is at a standstill. This is readily accomplished, referring to Fig. 15, by including a second control switch 39a in the primary circuit of the spark coil 31, as for instance in series with the wire 33 of the primary circuit. Referring to Fig. 1, the switch 39a is actuated by a cam link 16a which operates in conjunction with the feed dogs 16 and has a vertical reciprocatory motion. The arrangement is such that the switch 39a is maintained open during the intervals that the feed dogs 16 are not advancing the workpieces, the switch being closed during the remaining intervals when the dogs are advancing the workpieces. Thus, the processing of the workpieces is automatically done only while they are in movement and not when they are at a standstill, and in certain circumstances this is advantageous in preventing undue burning or fusing of the thermoplastic material.

Although in the embodiment of the invention illustrated in Figs. 1, 2 and 6, the electrodes 19 and 19a are energized from the secondary of a spark coil so as to cause a typical ignition spark to jump between these electrodes, it should be understood that the thermal device 18 is not limited to this particular type of discharge, since high potential energization having other characteristics may be applied to the electrodes, and the term "electric spark" as used in the appended claims is intended to include all electronic discharges which result in a hot electronic stream having the capacity of fusing thermoplastic material.

Referring to Fig. 10, a thermal device 44' is shown which may be incorporated with the machine of Figs. 1 and 2 in place of the thermal device 18. The thermal device 44' produces a localized, concentrated cutting and fusing heat by use of a gas flame which issues from a burner tube 45' having a flattened tip 46' at its bottom. The burner tube 45' has an air adjustment 47', and is connected with a control valve 48' which is fed from a gas line 49' and which has a lever 50 connected with suitable means (not shown) so as to be operated in conjunction with the switch 43 of the sewing machine.

The lever 50 is movable between open and closed positions, and is normally held in the closed position shown by a tension spring 51. When the lever 50 is in closed position, gas is shut off from the burner tube 45', and no flame is produced at the tip 46. When the valve lever 50 is moved clockwise to open position from the closed position shown, gas is admitted from the line 49' to the burner tube 45', and is ignited by a pilot flame 52 which is projected into a cut 53 in the wall of the burner tube. The pilot flame 52 is fed by gas from the gas line 49' through a small pilot tube 54 as shown.

By this arrangement, actuation of the sewing machine switch 43 to operate the sewing machine automatically opens the valve 48' so that a thin or narrow, sheet-like cutting flame is produced at the tip portion 46' of the burner tube. Thus, as the fabric sections are fed into the machine by the feeding mechanism thereof they will be cut and/or fused by the thermal device 44'. When the operation of the machine is halted by opening of the switch 43, the valve lever 50 will be actuated to shut the valve 48' and extinguish the gas flame.

Another form of thermal device is indicated at 55 in Fig. 11, and comprises a relatively slender tightly stretched wire 56 heated to red heat or above. This thermal device may also be substituted for the thermal device 18 in the machine of Figs. 1 and 2. The thermal device 55 comprises a pair of holders 57 and 57a which are electrically insulated from each other and which support between them the taut wire 56. The holders 57 and 57a are connected by leads 58 and 59 respectively to a source of current (not shown) which is sufficiently strong to quickly bring the wire 56 to at least a red heat.

The energization and deenergization of the wire 56 may be controlled by switch means (not shown) operable in conjunction with the sewing machine switch 43, in the same manner as the switch 39, of Fig. 6, operates.

In connection with the hot-wire type of thermal device 55, it should be noted that when current is shut off from the wire 56 the latter will immediately quickly cool due to the small mass which it has, and therefore will not, when the fabric sections being cut are at a standstill, produce enough heat to cause ignition of the sections. However, due to its small mass, the wire 56 will practically immediately attain red heat when the current is turned on, and therefore since no appreciable lag exists between the heating of the wire and the operation of the machine, the fabric sections will be cut or processed in a manner similar to that accomplished by the instantaneous-acting spark type of thermal device 18.

Each of the thermal devices 18, 44' and 55 described above produces an intense localized heat which preferably has a temperature higher than the ignition point of the fabric, and the term "localized heat" as used herein shall be understood to mean heat concentrated at a point or small area or having a small, controlled cross-section as produced by such devices.

A seam 26d illustrating a modification of the invention is shown in Fig. 16. This seam is formed by superposing a fabric section 60 on another fabric section 61 so that the edge portions of the sections are flush with each other, and then trimming, processing and overseaming the edge portions as described above in accordance with the invention. The fabric section 60 is then folded to overlie the sewed edge portion thereof, and a facing or binding strip 62 is placed under the edge portion of the fabric section 61. This assemblage is then sewed together by stitches 63, the latter holding the seam in a flat compressed state, and retaining the facing strip in place so that the seam is covered over and concealed thereby. Such a seam is ornamental, and is exceedingly strong since in addition to the double stitching the sewed edge portions of the fabric sections are prevented from raveling or fraying by the processing or fusing procedure.

In accordance with this invention fabric sections which may be composed entirely of cotton, wool or similar fibres which are not thermoplastic, or other sections having a cloth-like flexibility and preferably a fibrous make-up, such as sections of leather, for instance, may be securely joined together or seamed. As shown in Fig. 17, the juxtaposed edge portions of a pair of superposed flexible sections 64 and 65 are interposed between a pair of thermoplastic facing or binding strips 66 and 67, and the pile-up or assemblage is fed under the presser foot 12 and between the high-tension processing electrodes 19 and 19a. The presser foot 12 maintains the strips 66, 67 and the edge portions of the flexible sections 64, 65 close together in intimate contact with each other. Upon the electrodes 19 and 19a being energized and the assemblage fed through the machine, the processing spark will trim and fuse together the outer edges of the facing strips 66 and 67. Immediately thereafter the assemblage will be sewed together by an overseam stitch, and upon the sections 64 and 65 being spread apart the seam 26e will appear in cross-section as shown in Fig. 18. In this seam the thermoplastic facing strips 66 and 67 are fused and joined together, and the edges of the sections 64 and 65 are in abutting relationship.

During the fusing or processing of the strips 66 and 67 the thermoplastic material thereof will imbed and trap minute fibres of the sections 64 and 65 so that, in addition to the facing strips being secured to each other they are to some extent secured to the edge portions of the sections by the fusing. This tends to prevent raveling or fraying of the edges of the sections when these latter are of woven fabric or the like, and results in a seam which, while being very narrow, has a substantial strength.

A seam 26f illustrating another modification of the invention is shown in Fig. 20, and workpieces being processed prior to the sewing of the seam are shown in Fig. 19. In forming this seam, a fabric section 68 is superposed on a second fabric section 69 so that the edge portions of the sections are juxtaposed, and a thermoplastic binding strip 70 is interposed between the said edge portions. This assemblage is then passed between the high-tension electrodes 19 and 19a, and the spark from the said electrodes fuses the binding strip 70 and causes it to adhere to the fabric sections 68 and 69 and to imbed the fibres of the fabric sections. Preferably pressure is applied to the assemblage by the presser foot 12 to maintain the edge portions of the fabric sections in intimate contact with the binding strip 70 during the fusing of the latter. Upon leaving the electrodes 19 and 19a the fabric sections and binding strip are sewed together as by an overseam stitch. After the sewing, and upon the fabric sections 68 and 69 being spread apart to flatten the seam it will appear in cross-section as shown in Fig. 20. It will be noted that the thermoplastic binding strip 70 is interposed between the juxtaposed edges of the fabric sections 68 and 69, and as a result of the binding strip being fused and adhering to the fibres or threads of the fabric sections, the edge portions of the latter will be prevented from fraying, raveling or pulling out. This is an important advantage, since the strength of a seam depends on the individual threads or fibres remaining anchored, and if even one fibre should start to pull away, the seam will quickly lose its strength and fail. The fabric sections 68 and 69 may be of cotton, wool or the like, and as an example, the fabric section 68 may be of jersey material and the fabric section 69 may have an elastic weave containing strands of rubber. In the joining of two such fabric sections it is often difficult to reduce the size of the seam and maintain its strength within practical limits. However, by the interposition of the fused plastic binding strip 70 in the seam, the individual threads or fibres of the sections are anchored and prevented from pulling loose when the seam is under stress, and as a result a greater strength is obtained.

A thin thermoplastic sheet of cloth-like flexibility may be cut or severed in accordance with the invention as already described in connection with the fabric sections 20 or 21, and the edge portion of the sheet may be processed by the fusing of the material, the said portion thereby becoming thicker, stronger and more tear-resistant. A cross-section of such a processed edge portion is shown in Fig. 21, and it will be noted that a small bead is formed at the very edge of the sheet as a result of the fusing of the material thereof. This bead results in a considerably stronger edge, and when such processed edges are sewed together a much stronger seam is obtained, which resists tearing to a great extent.

While in the accompanying drawings the workpieces are indicated as being fabric sections, it should be understood that these workpieces may also be of thin thermoplastic sheeting of cloth-like flexibility. Such sheeting readily softens and fuses upon the application of heat and may be easily sewed in the manner of fabric sections so that they may be passed through the machine of the invention, and severed, processed and joined together according to the method of the invention similarly to fabric sections containing thermoplastic fibres.

The improved seams 26, 26a, 26b, 26c, 26d, 26e and 26f of the present invention have various applications where strength, compactness and small size, ornamentation, etc. are desirable, each seam having a particular group of characteristics which determine the use for which it is best suited. Seams produced in accordance with the invention may be advantageously employed in the making of curtains, drapes, linings, shrouds, etc., as well as in the various articles of wearing apparel.

Variations and modifications may be made within the scope of this invention and portions of the improvements may be used without others.

I claim:

1. An article of apparel comprising a plurality of textile fabric sections having thermoplastic fibres; and stitches forming seams joining together adjacent edges of the fabric sections in abutting relationship, the thermoplastic fibres in the said edges being fused together to prevent fraying and to increase the strength of the seams.

2. An article of apparel comprising a plurality of sections of thin thermoplastic sheeting of cloth-like flexibility; and stitches forming seams joining together adjacent edges of the said sections substantially in abutting relationship, the said edges being fused together to increase the strength of the seam.

3. In a brassière, a seam formed of adjacent edge portions of breast-engaging fabric sections having thermoplastic fibres; and stitches joining together the said edge portions, the thermoplastic fibres in the edges of each portion being fused together and to the fibers of adjoining portions to prevent fraying and to increase the strength of the seam.

4. A brassière comprising a plurality of breast-engaging fabric sections having thermoplastic fibres; and stitches forming flat seems joining together adjacent edges of the fabric sections in abutting relationship, the thermoplastic fibres in the said edges being fused together to prevent fraying and to increase the strength of the seams.

5. A brassière comprising a plurality of breast-engaging fabric sections having thermoplastic fibres; and stitches forming flat seems joining together adjacent edges of the fabric sections in abutting relationship, the thermoplastic fibres of one edge being fused with the thermoplastic fibres of the other edge to join the edges and prevent fraying, thereby to increase the strength of the seams.

6. In a sewing machine, the combination with stitch-forming means including a needle, of a cutter mounted ahead of the needle for trimming workpieces fed to the needle; and a thermal device disposed between the cutter and needle for fusing the trimmed edges of thermoplastic fabric workpieces fed to the needle.

7. In a sewing machine, the combination with stitch-forming means including a needle, of a cutter for trimming workpieces fed to the needle; a pair of juxtaposed high-tension electrodes disposed between the cutter and needle for passing an electric spark across the trimmed edges of the workpieces; and a source of high-tension electricity connected to the said electrodes.

8. In a body restraining garment, a seam formed of adjacent edge portions of a plurality of body-engaging fabric sections having thermoplastic fibers; and stitches joining together the said edge portions, the thermoplastic fibers in the edges of each portion being fused together and to the fibers of adjoining portions to prevent fraying and to increase the strength of the seam.

9. In a body restraining garment, a fabric seam formed by a plurality of body-engaging textile fabric sections having thermoplastic fibers, the said fibers of one section at an edge portion thereof being fused together directly to the fibers of the other section at an edge portion thereof, said fibers being fused together by the thermoplasticity of the fibers themselves; and stitches passing through and across the fused edge portions of the fabric sections, whereby fraying is prevented and the strength of the seam is increased.

10. In a body restraining garment, a fabric seam formed by a plurality of adjacent edge portions of body-engaging textile fabric sections having thermoplastic fibers, an edge portion of one section extending substantially in juxtaposed relation to an edge portion of another section with the thermoplastic fibers in the edge portions of the respective sections being fused together by the thermoplasticity of the fibers themselves; and stitches passing through the fused edge portions securing the same together, whereby fraying is prevented and the strength of the seam is increased.

STANLEY H. PHILLIPS.

REFERENCES CITED

The following references are of record in the file of this patent:

UNITED STATES PATENTS

| Number | Name | Date |
|---|---|---|
| Re. 21,123 | Meck | June 20, 1939 |
| 730,944 | Merrow | June 16, 1903 |
| 1,349,711 | Berger | Aug. 17, 1920 |
| 1,773,967 | Dreyfus | Aug. 26, 1930 |
| 1,802,634 | Dreyfus | Apr. 28, 1931 |
| 1,871,046 | Dickie | Aug. 9, 1932 |
| 1,992,680 | Talmadge | Feb. 26, 1935 |
| 2,035,138 | Maxfield | Mar. 24, 1936 |
| 2,093,425 | Dreyfus | Sept. 21, 1937 |
| 2,120,458 | Bodle | June 14, 1938 |
| 2,191,545 | Schneider | Feb. 27, 1940 |
| 2,251,282 | Huizeng | Aug. 8, 1941 |
| 2,367,725 | Lindh | Jan. 23, 1945 |
| 2,406,830 | Homan et al. | Sept. 3, 1946 |
| 2,438,685 | Stevens | Mar. 30, 1948 |
| 2,477,040 | Brown et al. | July 26, 1949 |